United States Patent [19]
Nozaki et al.

[11] Patent Number: 5,791,722
[45] Date of Patent: Aug. 11, 1998

[54] STRUCTURE FOR ATTACHMENT OF WEATHER STRIP

[75] Inventors: Masahiro Nozaki; Atsushi Hikosaka, both of Nakashima-gun, Japan

[73] Assignee: Yoyada Gosei Co., Ltd., Aichi-ken, Japan

[21] Appl. No.: 699,059

[22] Filed: Aug. 9, 1996

Related U.S. Application Data

[62] Division of Ser. No. 391,605, Feb. 21, 1995, Pat. No. 5,590,926.

[30] Foreign Application Priority Data

| Feb. 21, 1994 | [JP] | Japan | HEI 6-46493 |
| Apr. 30, 1994 | [JP] | Japan | HEI 6-114597 |
| Aug. 31, 1994 | [JP] | Japan | HEI 6-232220 |

[51] Int. Cl.⁶ .................................................. B60J 10/08
[52] U.S. Cl. ................................................... 296/146.9
[58] Field of Search .......................... 296/206, 93, 146.9; 49/490.1, 498.1, 440, 441; 156/71; 428/31

[56] References Cited

U.S. PATENT DOCUMENTS

| 5,168,668 | 12/1992 | Mishima et al. ........................ 49/440 |
| 5,527,583 | 6/1996 | Nozaki et al. ........................ 296/146.9 X |

FOREIGN PATENT DOCUMENTS

| 0512673 | 11/1992 | European Pat. Off. ........... 296/146.9 |
| 1-112110 | 7/1989 | Japan. |
| 5-213119 | 8/1993 | Japan. |
| 2036840 | 7/1980 | United Kingdom. |
| 2186619 | 8/1987 | United Kingdom. |
| 2266742 | 11/1993 | United Kingdom. |

OTHER PUBLICATIONS

Patent Abstract of Japan, Publication JP5213119, Date: Aug. 24, 1993, Weatherstrip.
European Search Report, Jun. 6, 1995.

*Primary Examiner*—Andrew C. Pike
*Attorney, Agent, or Firm*—Pillsbury Madison & Sutro LLP

[57] ABSTRACT

A structure attaches weather stripping to the body along the side of a roof of a vehicle body, and is especially useful around a door opening thereof. A molding that extends along the side of a roof for covering an outside surface of the weather strip is attached to the vehicle by securing a base portion of the molding to an outer part of the body wall defining the door opening. The weather strip has a bottom portion and a sealing portion. An outer part of the bottom portion is bonded to the base portion of the molding with a first double-sided adhesive tape, while an inner part of the bottom portion is bonded to the body wall defining the door opening with a second double-sided adhesive tape which is made of a material having a density below that of a material forming the first double-sided adhesive tape.

2 Claims, 5 Drawing Sheets

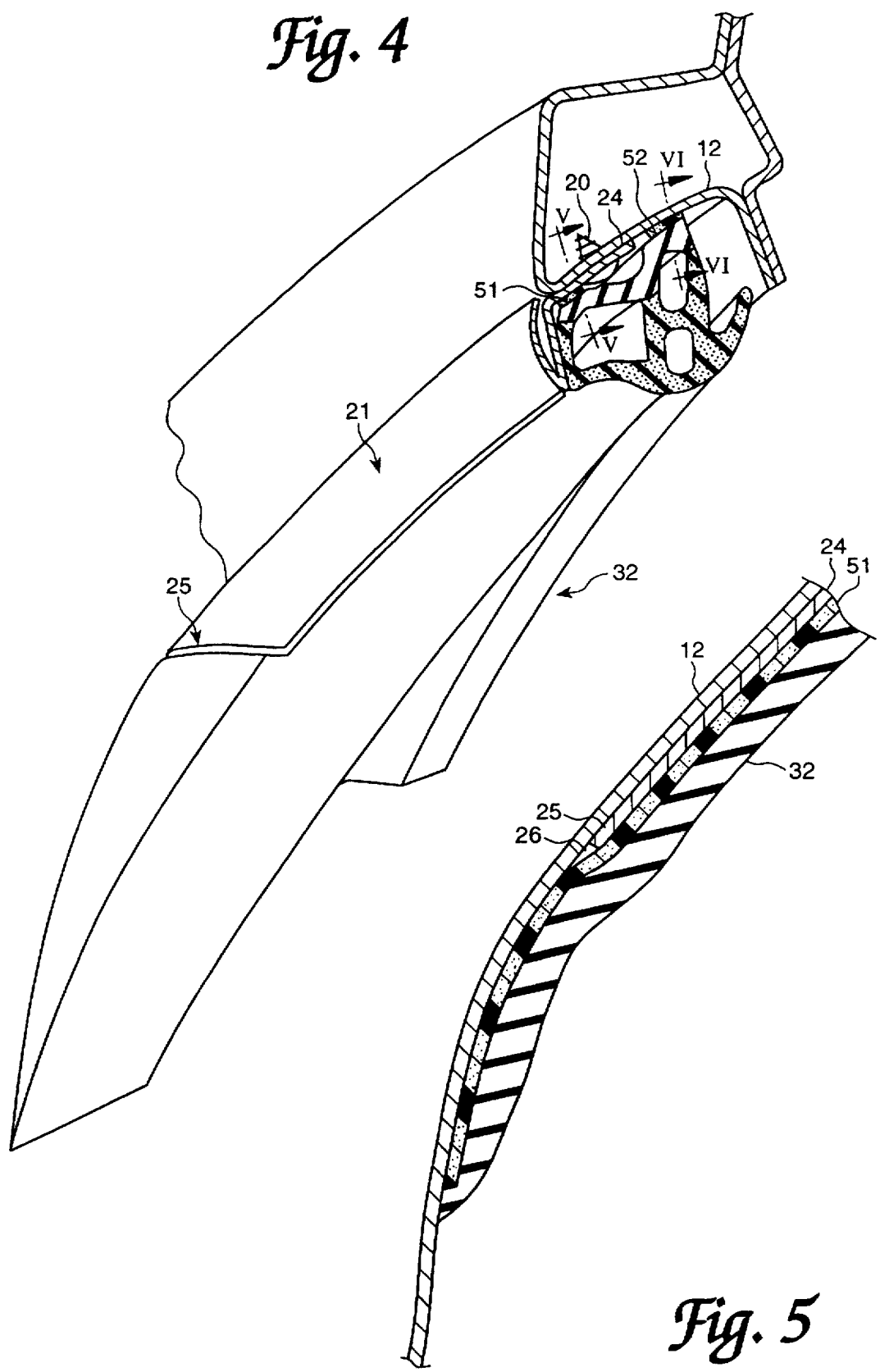

5,791,722

1

STRUCTURE FOR ATTACHMENT OF WEATHER STRIP

This is a division of application Ser. No. 08/391,605 filed Feb. 21, 1995, now patented under U.S. Pat. No. 5,590,926.

BACKGROUND OF THE INVENTION

1. Field of the Invention

The present invention relates to weather strips for motor vehicles, and, more particularly, to a structure for attaching weather strips along a side portion of a roof, and along the roof portion which defines the door openings in the vehicle body.

2. Description of Prior Art

It is known to attach weather strips along the sides of a roof portion of a vehicle to provide seals around closed windows, especially door mounted windows.

In one example of such a structure for attaching weather strips, a bottom portion of a weather strip is bonded to a body wall, defining a door opening, with double-sided adhesive tapes (Japanese Utility Model application laid-open No. Hei 1-112110).

Roof molding is generally provided on a vehicle body structure to cover an outside surface of weather stripping used adjacent the roof. Such roof molding is normally attached to the vehicle body through a base portion secured to the vehicle body, for example, about the door opening. In another example of a structure for attaching weather strips, the thus attached roof molding has a configuration that holds the bottom portion of the weather strip, and serves as a retainer therefore. With this structure, the bottom portion of the weather strip is fitted in or bonded to the roof molding which acts as the retainer (Japanese Patent application laid-open No. Hei 5-213119).

The present inventors have contemplated one structure for attachment of weather strips based on the above-described examples of structures. Namely, as shown in FIG. 1, along a side 10' of the roof of a vehicle body, roof molding 16 is attached by securing a flat plate-shaped base portion 17 to an outer part of a body wall 12', which defines a door opening, with screws 20. A bottom portion 31 of a weather strip 30 is bonded to both the base portion 17 of the molding 16 and to an inner part of the body wall 12' with double-sided adhesive tape 50. With this arrangement, a retainer is not needed, thereby reducing production costs; and by virtue of the double-sided adhesive tape 50, the weather strip 30 can be attached easily and efficiently.

This structure, however, suffers from the formation of steps or depressions created around the heads of screws 20 and along the inner edge of base portion 17. These steps generate spaces between the double-sided adhesive tape 50 and both the facing roof molding 16 and body wall 12'. This can cause the double-sided adhesive tape 50 around these spaces to peel off gradually from the roof molding 16 and the body wall 12', so that the sealing properties of the weather strip 30 against the body wall 12' and the stability in attachment of the weather strip 30 to the vehicle body both will gradually degrade.

Front and rear ends of the roof molding 16 are located on the door belt line, and steps are also formed along the front and rear ends of the roof molding 16 with respect to the body wall defining the door opening. Furthermore, in a joint portion, which joins the weather strip 30 along the side of the roof and a weather strip along a center pillar, steps are also formed in a bottom surface thereof. These steps cause spaces to be formed between the double-sided adhesive tape 50 and the facing body wall, thereby exhibiting similar problems.

SUMMARY OF THE INVENTION

Accordingly, it is an object of the present invention to provide a structure for attaching weather strips, covered by molding extending along the side of a roof of a vehicle body, with double-sided adhesive tape without creating spaces or any peeling of the double-sided adhesive tape and related problems.

The above-described object of the present invention is attained by having an outer part of a bottom portion of the weather strip bonded to a base portion of the roof molding, which is secured to the part of the vehicle body wall defining a door opening, with a first double-sided adhesive tape. In addition, an inner part of the bottom portion of the weather strip is also bonded to the body wall on the inside of the base portion of the roof molding with a second double-sided adhesive tape that is spaced from and separate from the first adhesive tape.

The object of the present invention is also attained by having the bottom portion of the weather strip formed of a hard material formed with an outer end portion configuration that acts as the roof molding. The resulting roof molding is bonded to an outer part of the body wall defining a door opening with a first double-sided adhesive tape, while an inner part of the hard bottom portion is bonded to an inner part of the body wall defining a door opening with a second double-sided adhesive tape.

Other objects, features, and characteristics of the present invention will become apparent upon consideration of the following description and the appended claims with reference to the accompanying drawings, all of which form a part of this specification.

BRIEF DESCRIPTION OF THE DRAWINGS

FIG. 4 is a perspective view of the portion A of FIG. 2 taken along the line IV—IV of FIG. 2;

FIG. 5 is a longitudinal sectional view, taken along the line V—V of FIG. 4;

DETAILED DESCRIPTION OF THE PRESENTLY PREFERRED EXEMPLARY EMBODIMENTS

Figure 1:
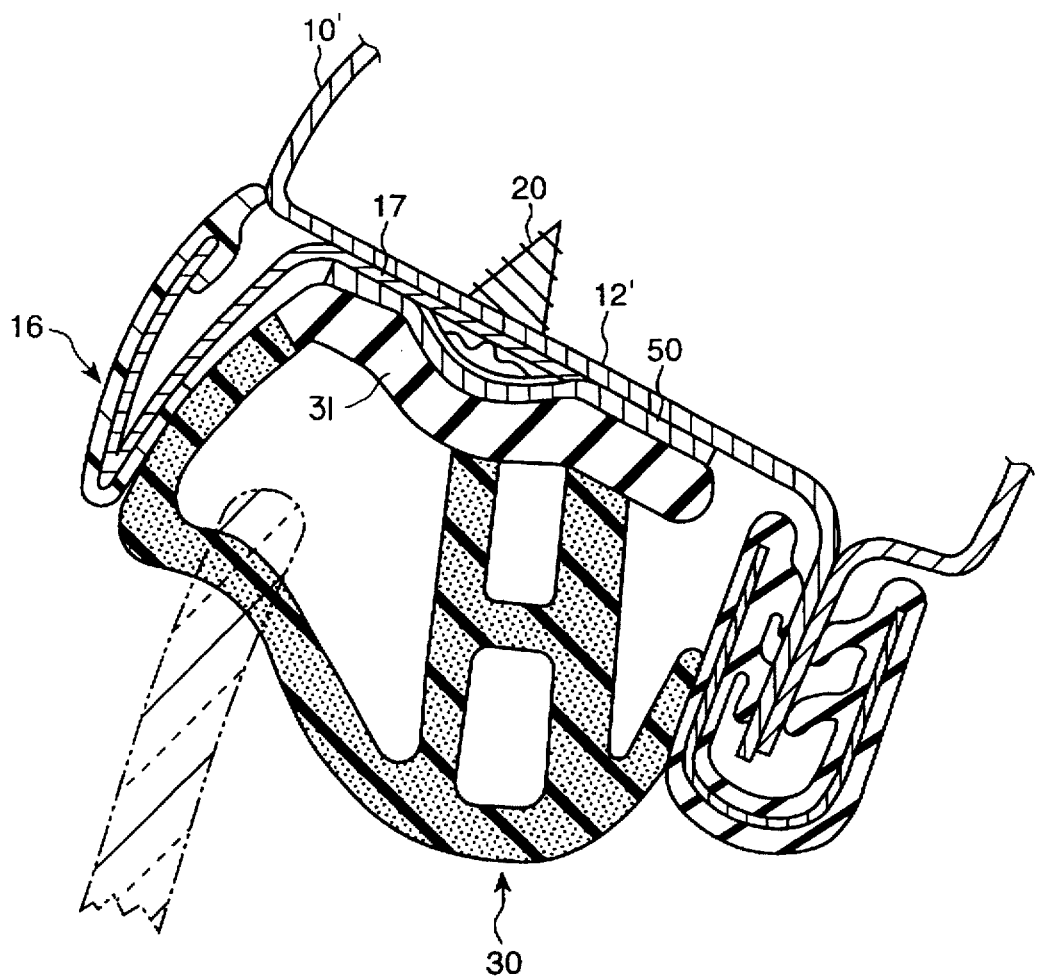
FIG. 1 is a cross-sectional view of a prior art preliminary version of a weather strip attaching structure.
Figure 2:
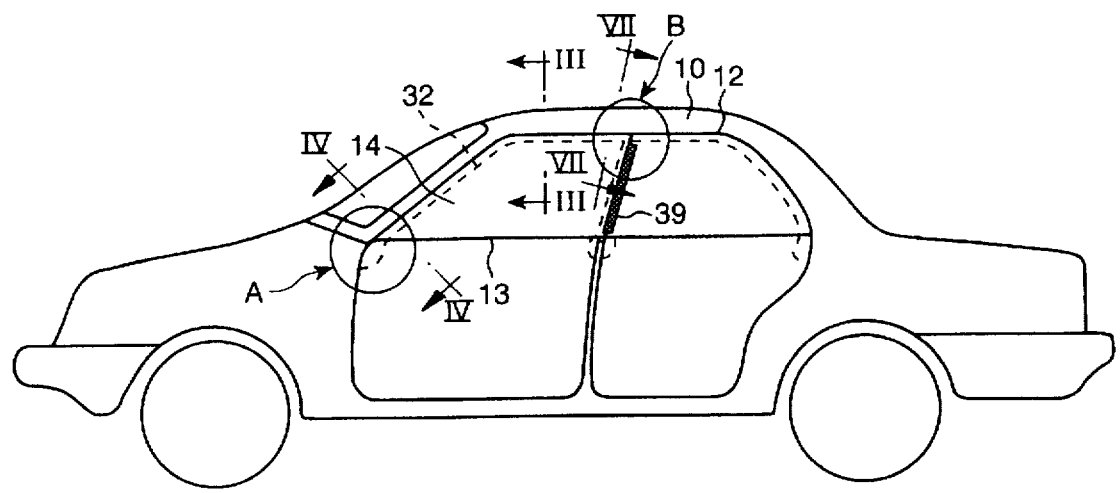
FIG. 2 is a side elevational view of a motor vehicle to which the present invention is applied.

FIGS. 2 through 7 illustrate a first embodiment of the present invention. As shown in FIG. 2, a weather strip 32 is attached to a body wall 12 along a side 10 of the roof of a vehicle body to provide a seal around a door window pane 14 of a sashless door.

Figure 3:
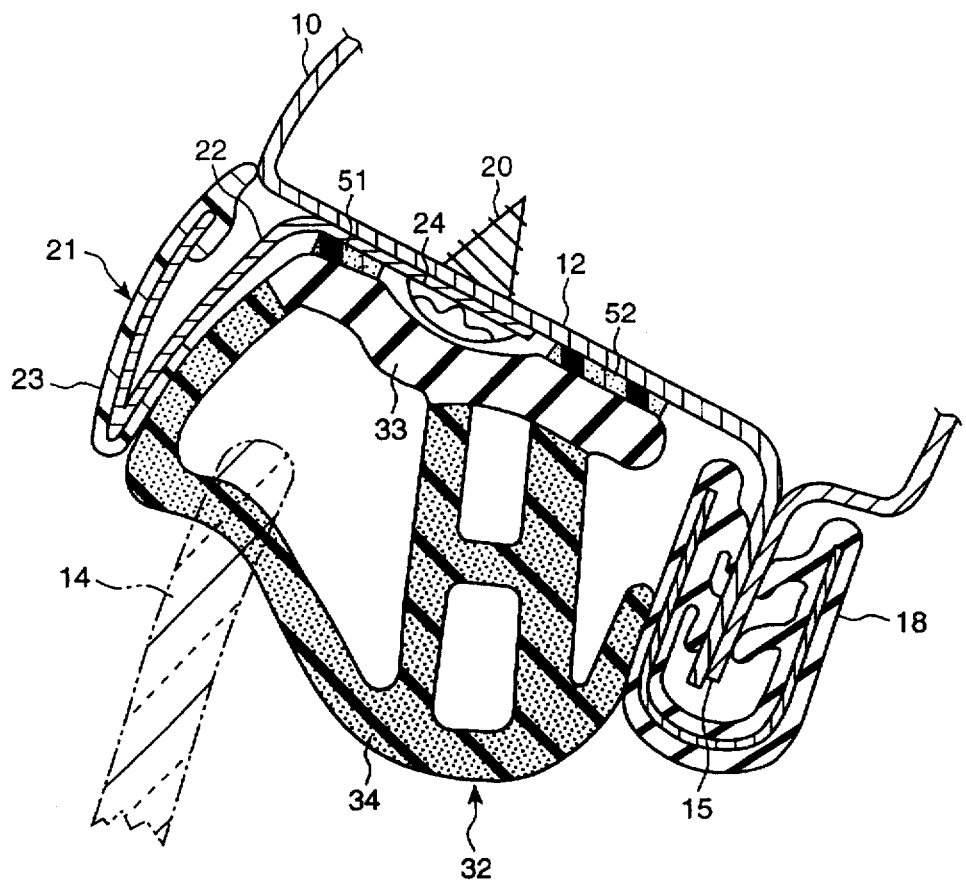
FIG. 3 is a cross-sectional view of a first embodiment of the present invention taken along the line III—III of FIG. 2.

As shown in FIG. 3, the weather strip 32 is an extruded body of rubber, and is composed of a bottom portion 33, made of solid rubber, and a tubular sealing portion 34, made of sponge rubber, which is pushed up by the door window pane 14 as the window moves into a closed position.

The body wall 12, defining a door opening, forms a flat weather strip-attaching face. A roof molding 21, on the side of the roof, is composed of a metal member 22 and a molding member 23 which covers an outer portion of the metal member 22. A base portion 24 of the metal member 22 is flat and has a width less than that of the body wall 12. The base portion 24 is positioned in contact with the body wall 12 and is secured thereto, for example, with screws 20.

The weather strip 32 is attached using two belt-shaped double-sided adhesive tapes (hereinafter merely called "adhesive tape"). More specifically, an outer part of the bottom portion 33 of the weather strip 32 is bonded to the base portion 24 of the roof molding 21, along a region outside of screws 20, with a first adhesive tape 51. An inner part of the bottom portion 33 is also bonded to the body wall 12 but inside the inner edge of the base portion 24, with a second adhesive tape 52. As shown in FIG. 3, a trim member 18 is attached to a body flange 15 which protrudes from body wall 12.

With this arrangement, the adhesive tapes 51 and 52 are, respectively, arranged away from the steps around the heads of the screws 20 and along the inner edge of the base portion 24 of the roof side molding 21. Accordingly, no space is generated between the adhesive tapes 51 and 52 and the facing roof molding 21 and body wall 12. Consequently, the adhesive tapes 51 and 52 are positioned in a manner that prevents the gaps that can lead to peeling of base portion 24.

FIG. 4 is a perspective view of a front end of the weather strip 32 showing the portion designated A in FIG. 2. A front end of the roof molding 21 terminates on a door belt line 13 (FIG. 2). In contrast, the front end of the weather strip 32 further extends downwardly. As shown in FIG. 5, the first adhesive tape 51, which bonds weather strip 32 to base portion 24 of the roof molding 21, extends downwardly along a front end 25 of the base portion 24 to bond the front end of the weather strip 32 to the body wall 12 defining the door opening. This results in a space 26 being formed between the first adhesive tape 51 and the facing body wall 12 adjacent the front end 25 of the base portion 24.

Figure 6:
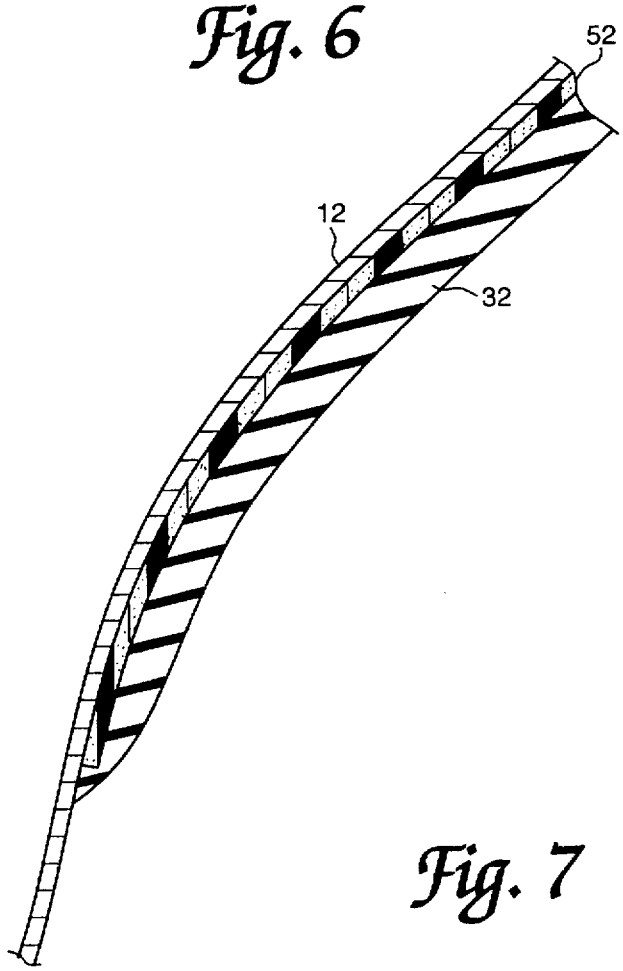
FIG. 6 is a longitudinal sectional view, taken along the line VI—VI of FIG. 4.

As shown in FIG. 6, the second adhesive tape 52 bonds weather strip 32 to the body wall 12 defining the door opening over the entire length thereof.

If the first adhesive tape 51 around the resulting spaces 26 gradually peels away from body wall 12, the stability in attachment of the weather strip 32 to the body wall 12, and the sealing properties of the weather strip 32 against the body wall 12, are still both ensured. This is because, as shown in FIG. 6, the weather strip 32 is also bonded closely to the body wall 12 with the second adhesive tape 52.

Figure 7:
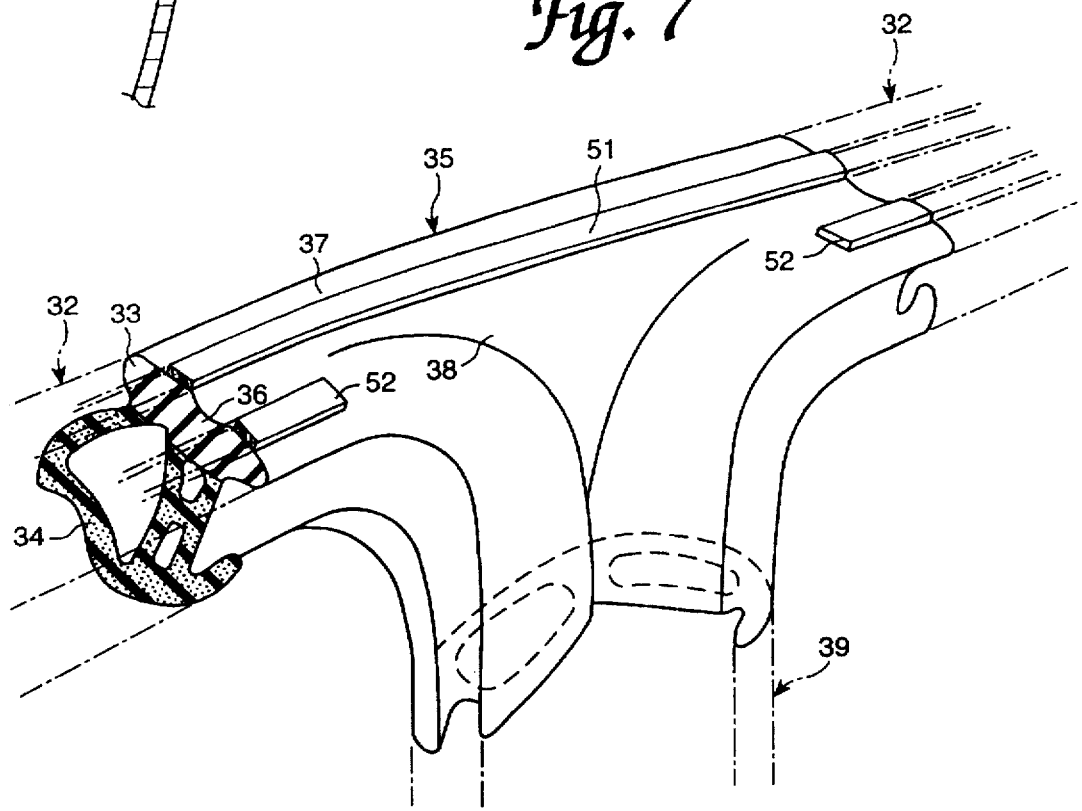
FIG. 7 is a perspective view of the portion B of FIG. 2 taken along the line VII—VII of FIG. 2.

FIG. 7 illustrates a molded joint member 35 which joins the weather strips 32 and a pillar weather strip 39, the portion designated B in FIG. 2. As shown, an outer part 37 of a bottom portion 36 of the joint member 35 forms a plane surface continuous with the bottom portions 33 of the weather strips 32. An inner part 38 of the joint bottom portion 36 has a concave configuration so as to join the bottom portions 33 of the weather strip 32 to the bottom portion of the pillar weather strip 39. The outer part 37 of the bottom portion 36 is bonded to the base portion 24 of the roof molding 21 (FIG. 3) with the first adhesive tape 51 which extends continuously along with the weather strips 32 as shown. The second adhesive tape 52, however, is cut off in the area of the inner part 38, of joint member 35, so as not to be-provided in and around the concave portion of the inner part 38 of the joint member 35. This structure eliminates the creation of gaps in the adhesive tape and thus the peeling of the second adhesive tape 52, which could occur if the second adhesive tape 52 was provided in and around the concave portion of the inner part 38.

In the joint member 35 shown in FIG. 7, the stability in the attachment of the weather strips 32 to the body wall 12, and the sealing properties of weather strips 32 against the base portion 24 of the roof molding 21, are both ensured by virtue of the continuous seal provided by the first adhesive tape 51.

With the present embodiment, the adhesive tapes 51 and 52 are, respectively, arranged away from the steps around the heads of the screws 20 and inner edges of the base portion 24 of the roof molding 21. With this arrangement, no space is generated between the adhesive tapes 51 and 52 and the facing roof molding 21 and body wall 12.

It is preferable to form the second adhesive tape 52 of a material that is softer, or more compressible or yieldable, than the material used to form the first adhesive tape 51 for the following reasons. There are step-like joints in the body wall 12 defining the door opening that result in spaces being formed between the base portion 24 of the roof molding 21 and body wall 12. If an upper edge of the roof molding 21 is spaced apart from a body wall along a side of the roof, water intrudes into the roof molding 21, and then further intrudes into the vehicle compartment by way of spaces around the step-like joints in the body wall 12. In order to overcome this water intrusion situation, the second adhesive tape 52 is formed of a soft material compressible by 25% in thickness under a load of 0.1 to 0.5 kg/cm², which improves the deformability of the second adhesive tape 52 thereby allowing it to conform with the step-like joints in the body wall 12. This results in the weather strip 32 being bonded much more closely to the step-like joints, without generating spaces, thereby exhibiting complete sealing properties even in such areas. Furthermore, with the present embodiment, the first adhesive tape 51 is formed of a relatively hard material compressible by 25% in thickness under a load of 0.8 to 2.0 kg/cm². This ensures good securing properties of the weather strip 32 to the base portion 24 of roof molding 21.

The adhesive tape is generally composed of a belt-like foam member of a foamed acrylic resin or the like, and adhesive layers provided on opposite surfaces of the belt-like foam member. The hardness of the adhesive tape, which can range as described above, can be adjusted by varying the expansion ratio of the belt-like foam member.

In the present embodiment, the bottom portion 33 of the weather strip 32 is preferably formed of solid rubber. Alternatively, the entire portion of weather-strip 32 may be formed of sponge rubber. In addition, a trim molding 60, such as that shown in FIG. 8, may be formed integrally with the weather strip 32. The adhesive tapes 51 and 52 need not be formed into equal widths and thicknesses but they could be as well. Further, the second adhesive tape 52 may be divided, for example, into two or more sections, in accordance with the configurations of the various bonding surfaces of the weather strip 32 and body wall 12.

With the first embodiment, by virtue of the adhesive tapes, the weather strip can be easily and efficiently bonded to the body wall defining the door opening, to which the roof molding is attached. If the adhesion of one of the adhesive tapes becomes incomplete or lessens, the other tape compensates for such adhesion losses so that the stability in adhesion and sealing properties of the weather strip can be ensured over the entire length thereof.

Figure 8:
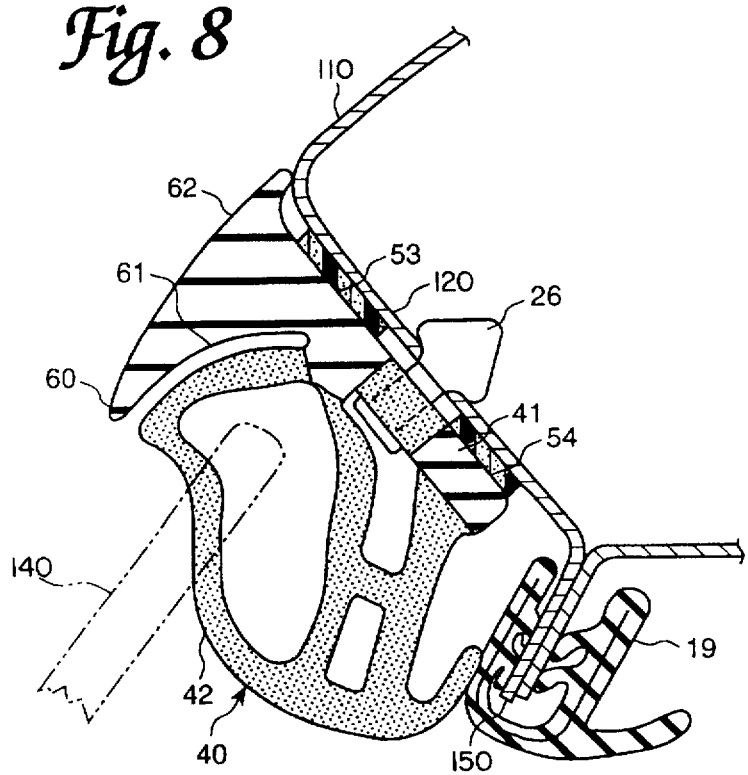
FIG. 8 is a cross-sectional view of a second embodiment in accordance with the present invention, taken along the same line as that of FIG. 3.

FIG. 8 illustrates a second embodiment of the present invention. A weather strip 40 has a hollow trapezoidal cross section, and is composed of a relatively thick and flat bottom portion 41 and a tubular sealing portion 42 formed integrally with bottom portion 41. The sealing portion 42 is pushed up by an upper edge of a door window pane 14. The bottom portion 41 is secured to body wall 120 approximately at its widthwise center with clips 26.

An outer end of the bottom portion 41 protrudes outwardly of the sealing portion 42 to form a molding 60 at the side of the roof. The molding 60 at the side of the roof has a generally triangular cross section. A bottom surface of the molding 60 comprises an extension of the bottom portion 41. An inside surface 61 of molding 60 is spaced from and opposed to an outside surface of the sealing portion 42. An outside surface 62 of the roof side molding 60 is generally flush with a body wall along the roof side 110.

The weather strip 40, provided with molding 60, is formed integrally, for example, by extrusion molding techniques. Molding 60 and the bottom portion 41, except for a clip-attaching part thereof, are formed of solid rubber. The clip-attaching part of the bottom portion 41, and the sealing portion 42, are formed of sponge rubber. The sponge rubber clip-attaching part facilitates pushing of the clips 26 into the weather strip 40 from the body wall 12.

An opening trim 19 is attached to a body flange 15 protruding from the body wall 120 to cover an inside surface of the weather strip 40.

The bottom surface of molding 60 and an inner part of the bottom surface of the bottom portion 41, of the weather strip 40, are bonded to the body wall 120 with first and second adhesive tapes 53 and 54, respectively. It is preferable, but not mandatory, to form the first adhesive tape 53 from a material that is softer than the second adhesive tape 54. With this arrangement, good sealing properties of the weather strip 40 against the body wall 120 can be ensured by virtue of the softer first adhesive tape 53. Also, good securing properties of the weather strip 40 to the body wall 120 can be ensured by virtue of the harder second adhesive tape 54.

With the second embodiment, since molding 60 is formed integrally with weather strip 40, it is unnecessary to separately prepare molding for the side of the roof and then attach it to the vehicle body. This simplifies construction, improves productivity, and lowers production costs. In addition, the body wall along the side 110 of the roof becomes flush with the outside surface of molding 60, thereby creating a simple and neat appearance around the side of the automobile roof.

Door window panes 140 tend to be drawn outwardly during high-speed travel of a motor vehicle. With the present embodiment, window panes 140 in contact with molding 60, which is rigid due to the triangular cross section through an outside wall of the sealing portion 42, provide support for the windows and prevents such window panes from being drawn further outwardly.

Figure 9:
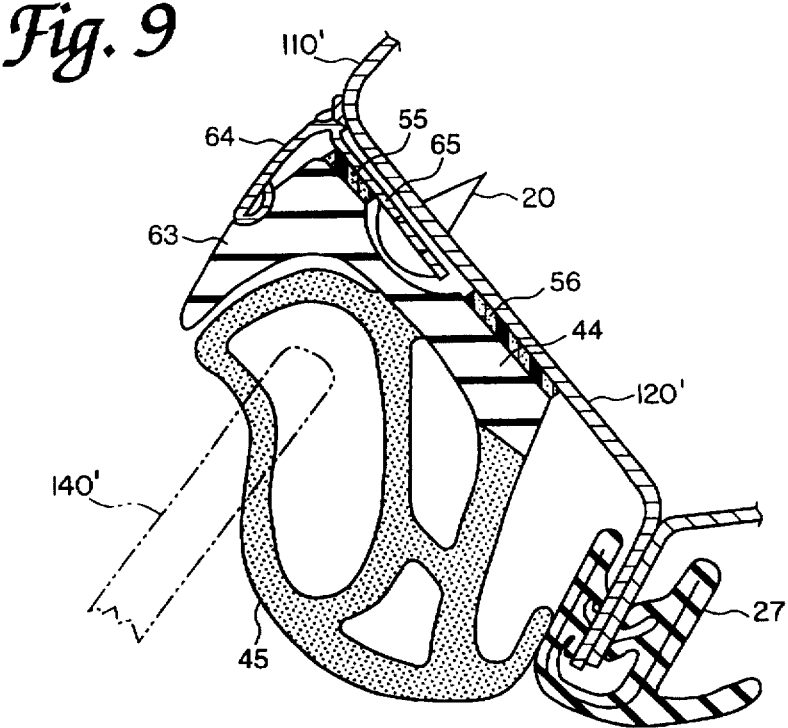
FIG. 9 is a cross-sectional view of a third embodiment in accordance with the present invention, taken along the same line as that of FIG. 3.

FIG. 9 illustrates a third embodiment of the present invention. As shown, a trim member 64, for example, one having a high gloss, is attached to a molding 63, again along the side of a roof. Molding 63 is formed integrally with a weather strip 43. The trim member 64 is, for example, composed of stainless steel or other metal plate. A base portion 65 of the trim member 64 is secured to an outer part of the body wall 120', that defines a door opening, with screws 20, while the outer portion of trim member 64 covers the upper half of the outside surface of molding 63.

A bottom portion 44 of the weather strip 43, with which the roof side molding 63 is integrally formed, extends around the heads of mounting screws 20. Molding 63 is bonded to base portion 65 of trim member 64 with a first adhesive tape 55. The inner part of the bottom portion 44 is bonded to the body wall 120' with a second adhesive tape 56. A sealing portion 45 and an opening trim 27, respectively, have a construction substantially identical to that of the second embodiment shown in FIG. 8.

The third embodiment achieves operational advantages substantially identical to those described for the second embodiment. Trim member 64 may be embedded in molding 63 such that an outer surface thereof is exposed from molding 63. Further, the bottom portion 44, as well as molding 63, may be formed of synthetic resin.

With respect to both the second and third embodiments of the present invention, since the molding is formed integrally with the weather strip, there is no need for a separate molding along the side of the roof. This again simplifies construction, and improves productivity since the weather strip and the molding are formed integrally, for example, by extrusion techniques. Still further, since the molding along the side of the roof which covers the weather strip is flush with the body wall along the roof's side, the appearance around the roof is also simple and neat. In addition, by virtue of the side molding, window panes in the doors or sides of the vehicle are prevented from being drawn outwardly.

While the invention has been described in connection with what are considered presently to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A structure for attaching a weather strip to a body wall along a side of a roof of a vehicle body wherein the weather strip has a tubular cross-sectional configuration and is comprised of a bottom portion and a sealing portion, the structure comprising:

a molding covering an outside surface of said weather strip and including a base portion secured to an outer part of said body wall;

a first double-sided adhesive tape bondingly secured to an outer part of said bottom portion and said base portion; and a second double-sided adhesive tape bondingly secured to an inner part of said bottom portion and said body wall, said second double-sided adhesive tape being made of a material having a density below that of a material forming said first double-sided adhesive tape.

2. The structure as in claim 1, wherein said base portion is secured to said body wall with screws, the outer part of said bottom portion being bonded to said base portion by positioning said first double-sided adhesive tape outside of said screws.

* * * * *